G. W. BRIDGMAN.
Car Brake.

2 Sheets—Sheet 1.

No. {1,545. / 32,549.}

Patented June 11, 1861.

Witnesses:

Inventor

G. W. BRIDGMAN.
Car Brake.

No. {1,545. / 32,549.}

2 Sheets—Sheet 2.

Patented June 11, 1861.

Witnesses:

Inventor:
G. W. Bridgman

UNITED STATES PATENT OFFICE.

GEORGE W. BRIDGMAN, OF SOMERVILLE, MASSACHUSETTS, ASSIGNOR TO HIMSELF AND OSGOOD DANE, OF SAME PLACE.

CAR-BRAKE.

Specification of Letters Patent No. 32,549, dated June 11, 1861.

*To all whom it may concern:*

Be it known that I, GEORGE W. BRIDGMAN, of Somerville, in the county of Middlesex and State of Massachusetts, have invented a new and useful Improvement in Brake Mechanism for Railway-Cars; and I do hereby declare the same to be fully described in the following specification and illustrated in the accompanying drawings, of which—

Figure 1:
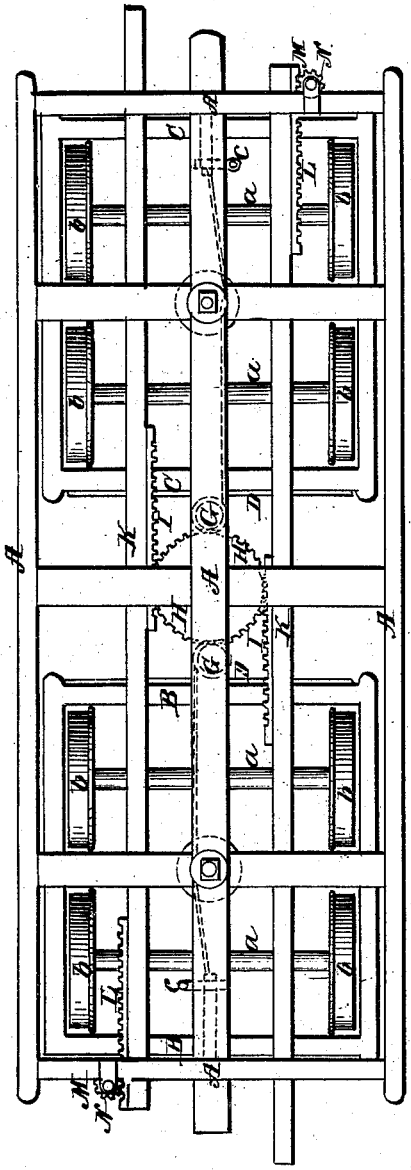
Figure 2:
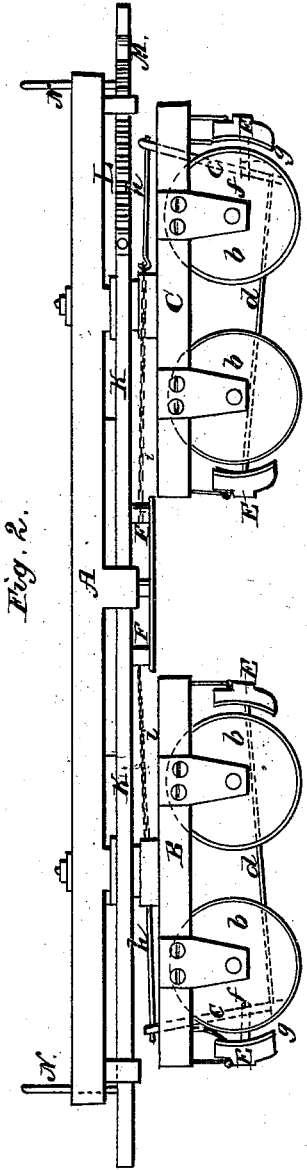
Figure 3:
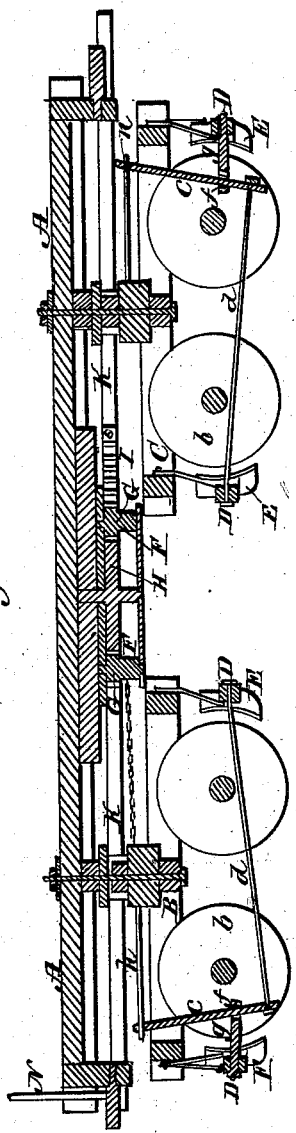
Figure 4:
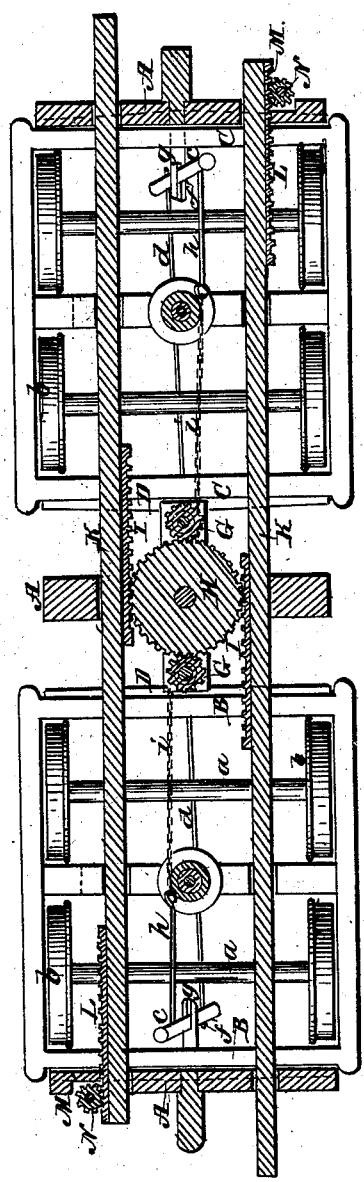

Figure 1, is a top view; Fig. 2, a side elevation; and Fig. 3, a longitudinal and vertical section of a railway carriage, provided with two truck frames, and having my invention applied to it. Fig. 4, is a horizontal section of the said carriage, such section being taken through the movable rack bars and their gears.

This carriage as exhibited in the drawings consists of a platform frame A, and two truck frames B, C, each of the latter being furnished with two axles *a, a,* and four wheels *b, b, b, b,* the whole being combined and applied together as represented in the drawings or in any well known manner. Each set of wheels is represented as furnished with a set of brake rubbers whose connecting bars are represented at D, D. The two bars D, D, of each truck frame are furnished with mechanism by which they may be drawn toward one another in order to force their brake rubbers E, E, against the peripheries of their respective wheels. This mechanism for each truck consists of a lever *c*, and a connecting rod, *d*, they being arranged as shown in the drawings. The fulcrum *f* of the said lever is supported by an arm *g*, extended from the outermost bar D the connecting rod, *d*, being made to extend from the lower arm of said lever to the innermost bar D. To the upper arm of each lever a draft rod *h* is affixed, such rod at its inner end being affixed to one end of a chain *i*, whose opposite end is affixed to the periphery of one of two drums or barrels F, F, which are arranged between the truck frames as shown in Fig. 3 of the drawings. A cogged pinion G is affixed to each drum and engages with a gear H, which is arranged between the two pinions and has on opposite sides of it two toothed racks I, I, with which it also engages. These racks are respectively fastened to the inner sides of two long slides or rack bars K, K, that extend entirely through the carriage in a longitudinal direction and are applied thereto in such manner as to enable each to be freely moved longitudinally within the carriage frame. Furthermore each of the said rack bars has a supplementary rack L, affixed to it, and at or near one end of it as shown in Fig. 1. This latter rack engages with the pinion M, carried by an upright shaft N, on whose upper end a hand wheel or crank may be affixed.

By means of the above described apparatus, the brakes of the railway car may be caused to be thrown into contact with their wheels either by power applied to either shaft N, so as to rotate it, or while the carriage may be in the act of being drawn by a locomotive engine by simply lessening the motion of the locomotive, in which latter case the momentum of the railway carriage will force such carriage toward the locomotive, and thereby cause one of the rack bars to be pressed backward within its carriage. Such a movement of the rack bar will cause its rack I to rotate the gear H. By this movement of the said gear not only will the other rack bar be impelled forward, but the two drums F, F, will be put in rotation and so as to produce draft on the two chains *i, i,* whereby they will be made to draw on the brake rubbers and effect the movement of the brakes against the wheels.

If each of a series of carriages is provided with my said brake operating apparatus and all of such carriages be arranged in a train and coupled together, the momentum of each and all of them while they may be in motion may be employed either to arrest or lessen the velocity of such motion, for by lessening the velocity of the draft engine, each carriage in succession will be impelled forward toward such engine, and as a matter of course, all the rack bars which may be in line with one another on either side of the carriage will be simultaneously moved. Under such circumstances one series of them will be forced backward and the other will be driven forward and thus the brakes of all the cars will be set in motion.

By having two rack bars, applied to the gear H, either end of the carriage may be coupled to the draft engine or with another carriage, as circumstances may require.

The hand wheel shafts, with their pinions and racks for engaging them with the rack bars, are auxiliary mechanism which enable brakemen to operate the brakes by manual force and also to employ such force in conjunction with that of the momentum of the cars in order to lessen their velocity.

I claim—

1. The combination and arrangement of the two rack bars K, K, the racks I, I, the gear H, and the two pinions G, G, and drums F, F, (or the mechanical equivalent of such pinions and drums) applied to the carriage body or platform frame, and the draft chains of the brakes of the two truck frames.

2. The arrangement and combination of the hand wheel shafts N, N, pinions M, M, and racks L, L, or their mechanical equivalents with the carriage and the rack bars K, K, the racks I, I, the gear H, the two pinions G, G, and drums F, F, or the mechanical equivalent of such pinions and drums the whole being to operate substantially as and for the purpose or purposes as specified.

G. W. BRIDGMAN.

Witnesses:
R. H. EDDY,
F. P. HALE, Jr.